UNITED STATES PATENT OFFICE.

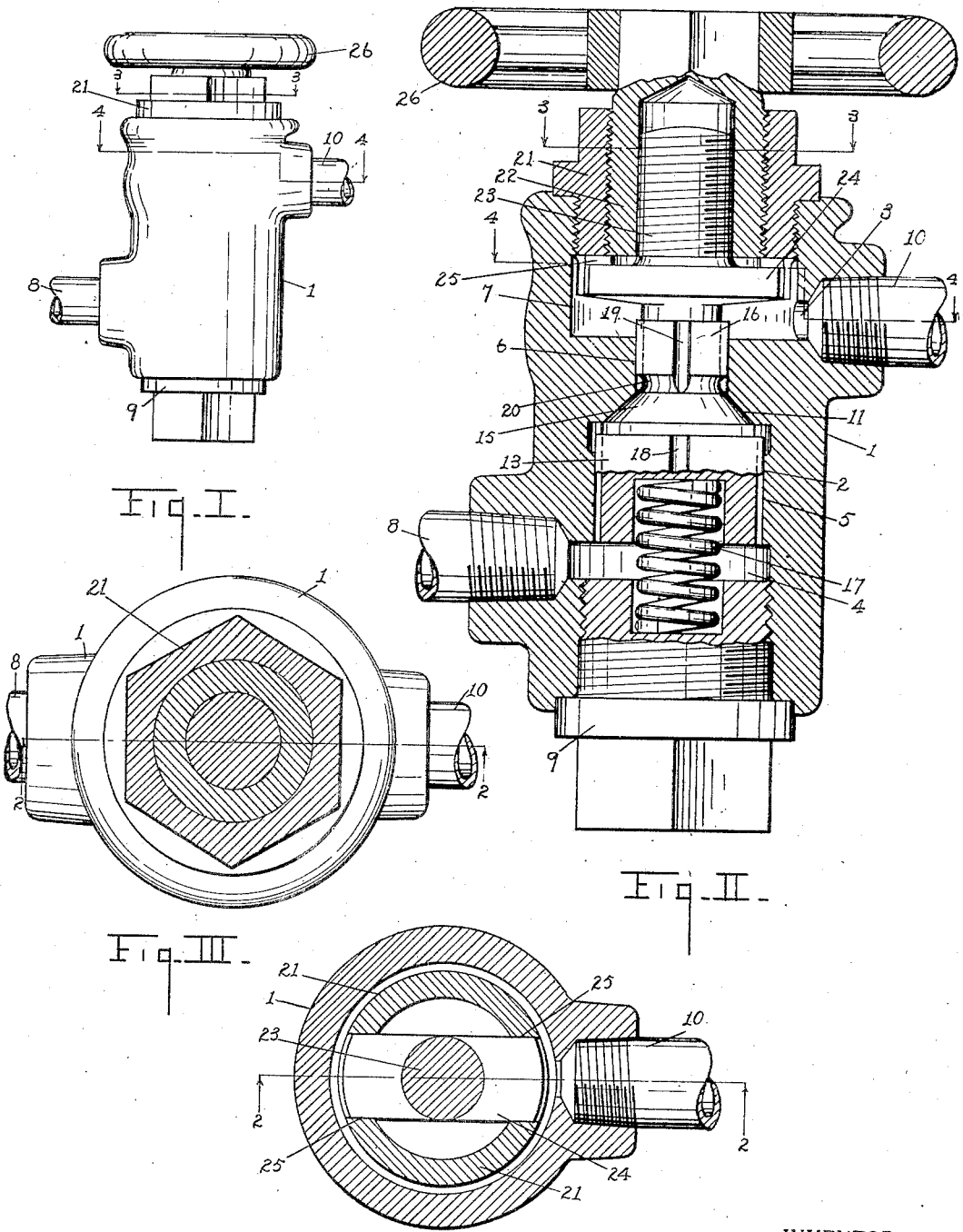

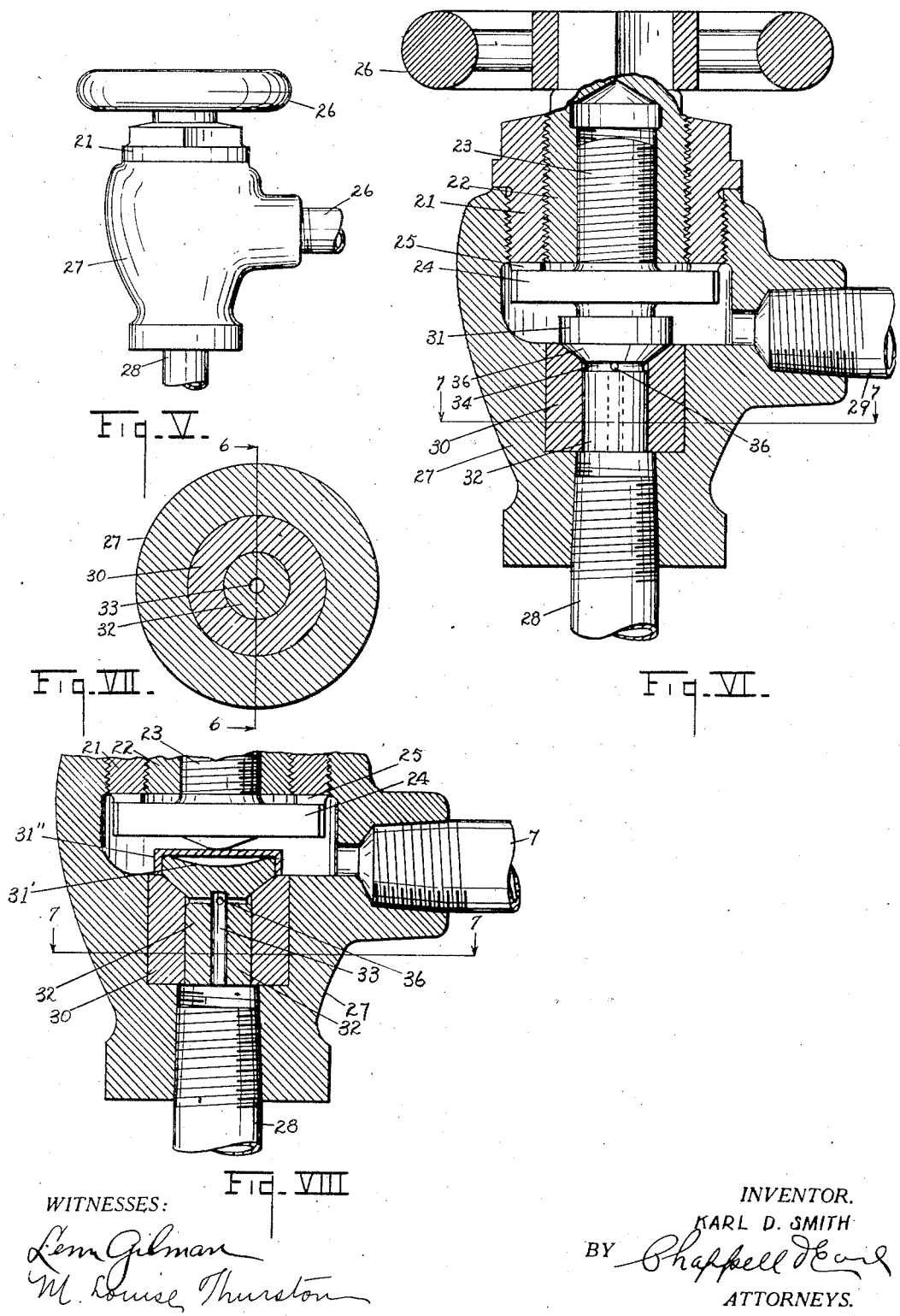

KARL D. SMITH, OF BATTLE CREEK, MICHIGAN, ASSIGNOR TO UNION STEAM PUMP COMPANY, OF BATTLE CREEK, MICHIGAN.

EMULSIFYING-MACHINE.

1,359,441.   Specification of Letters Patent.   Patented Nov. 16, 1920.

Application filed April 11, 1918. Serial No. 228,029.

*To all whom it may concern:*

Be it known that I, KARL D. SMITH, a citizen of the United States, residing at Battle Creek, county of Calhoun, State of Michigan, have invented certain new and useful Improvements in Emulsifying-Machines, of which the following is a specification.

This invention relates to improvements in emulsifying machines.

My present improvements relate to the type of machine shown in my Letters Patent issued March 12, 1918, No. 1259149, and designed particularly by me for treating milk and cream or mixing butter or fat with milk or cream, although desirable for use in emulsifying or mixing other substances.

The main objects of this invention are:

First, to provide an improved device of the class described which is simple and compact in structure and in the arrangement of parts.

Second, to provide a structure of the class described with an improved adjusting means whereby accurate and very fine adjustments are possible.

Third, to provide an improved resilient valve means.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is an elevation embodying the features of my invention.

Fig. II is a detail view mainly in vertical section on a line corresponding to line 2—2 of Figs. III and IV.

Fig. III is a horizontal section on a line corresponding to line 3—3 of Figs. I and II.

Fig. IV is a horizontal section on a line corresponding to the broken line 4—4 of Figs. I and II.

Fig. V is a detail side elevation of a modified embodiment of my improvements.

Fig. VI is a detail view mainly in vertical central section.

Fig. VII is a detail horizontal section on a line corresponding to line 7—7 of Figs. VI and VIII.

Fig. VIII is a detail sectional view showing the improved resilient valve means.

In the drawing similar reference characters refer to similar parts throughout the several views, and the sectional views are taken looking in the direction of the little arrows at the ends of the section lines.

Referring to the drawing, I provide a body member or casing 1 having a longitudinal bore or chamber 2 therein with a lateral discharge port 3 at its upper end. The chamber 2 is preferably stepped as shown in the accompanying drawing, that is, it has portions 4, 5, and 6, with an enlarged portion 7 above the portion 6, the outlet port 3 leading from this enlarged portion 7.

The inlet pipe 8 is connected to deliver near the lower end of the casing. The lower end of the casing is closed by a plug 9. The discharge pipe 10 is threaded into the casing to communicate with the discharge port 3. The casing is provided with a valve seat 11 which, in the structure illustrated, faces toward the inlet.

The valve member 13 has a conical portion 15 coacting with the valve seat. The valve member has a reduced portion 16 at its upper end reciprocating in the portion 6 of the valve casing chamber.

The body portion of the valve reciprocates in the portion 5 of the casing chamber below the valve seat. The valve member has longitudinal grooves 18 in its body portion providing passages for the fluid to be treated. These passages terminate at the base of the conical portion 15.

The portion 16 of the valve has longitudinal groove-like passages 19, the lower ends of which open into the annular groove 20 at the upper end of the conical portion 15.

The delivery of the material through the machine is controlled by the valve and coacting seat. The valve is effectively guided both at its upper and lower ends and any canting or tilting movement thereof is prevented. A coiled spring 17 is preferably provided to prevent the valve dropping away from its seat.

It will be noted that with the parts arranged as in Fig. II, the pressure of the fluid tends to urge the valve member toward its seat. The valve is adjusted and fixedly held in position by means of a differential screw mechanism comprising the members 21, 22, and 23, the member 21 being threaded into the casing and, in effect, constituting a casing member and a bushing for the outer adjusting member 22, which is threaded into the member 21. The inner adjusting member 23 is threaded into the adjusting member 22 and engages the valve member.

The threads of the adjusting members are of different pitch, no effort, however, being made to accurately illustrate the difference in pitch as it will be understood that the purpose is to secure a very fine and accurate adjustment for the valve.

The inner member 23 engages the upper end of the valve and is provided with projecting lugs 24 which engage slots 25 in the lower end of the bushing member 21, so that the inner adjusting member is supported against rotation. The outer adjusting member is provided with a hand wheel 26 or other suitable adjusting means.

In the modification shown in Figs. V, VI and VII, the casing member 27 has an inlet connection 28 and an outlet connection 29.

The valve seat member 30 is disposed to face away from the inlet. The valve member 31 coacts with this valve seat member and is adjustably supported by means of a differential screw mechanism, as described.

In the embodiment shown in Figs. V, VI, and VII, the valve member has a downwardly projecting portion 32 which is a sliding fit within the seat member and constitutes the guide for the valve member. This stem portion 32 of the valve member has a central bore 33 communicating with laterally directed passages 34 below the conical face 35 of the valve and opening into the annular groove 36 below such face, so that the liquid to be treated is evenly distributed about the valve. When it is desired to have the valve resilient and to open wider in event of an increase in pressure, I provide a spring structure as illustrated in Fig. VIII. The valve 31 is provided with a concave depression 31' in its top face. A resilient steel cap 31" is fitted over the valve and is adapted to yield at the center like the bottom of a spring bottom oil can and will thus permit the opening of the valve to an appreciable extent.

In treating milk and cream, I preferably heat the same to approximately Pasteurizing temperature. It is then passed through the machine under pressure, 1000–2000 pounds being found quite satisfactory for commercial purposes. In use the adjusting mechanism is operated to adjust the valve, satisfactory results being secured with the valve member opened about 3/1000 of an inch and may be reduced to any amount desired.

My improvements are particularly designed by me for embodiment in the structure of my said patent. I have, however, shown the same embodied in a modified form in Figs. V, VI, and VII. I have not attempted to illustrate various other modifications and adaptations of my present improvements, as I believe the disclosure made will enable those skilled in the art to which this invention relates to embody or adapt the same as may be desired.

Having thus described my invention, what I claim as new and desire to secure by Letters Patent, is:

1. In a structure of the class described, the combination of a casing provided with inlet and outlet connections, a valve seat facing toward the inlet of the casing, a valve member disposed to coact with said seat and so that the pressure of the fluid on the valve member is toward its seat, means for fixedly supporting said valve member comprising a pair of adjusting members, the inner of which engages the valve member and is threaded into the outer and provided with laterally projecting lugs, and a bushing-like casing member into which the outer adjusting member is threaded provided with slots coacting with said lugs to support the inner adjusting member against rotation.

2. In a structure of the class described, the combination of a casing provided with inlet and outlet connections, a valve seat facing toward the inlet of the casing, a valve member disposed to coact with said seat and so that the pressure of the fluid on the valve member is toward its seat, means for fixedly supporting said valve member from its seat comprising a pair of adjusting members, the inner of which engages the valve member and is threaded into the outer, the outer being threaded for adjustment, means for rotating the outer, and means for supporting the inner against rotation.

3. In a structure of the class described, the combination of a casing provided with inlet and outlet connections, a valve seat facing toward the inlet of the casing, a valve member disposed to coact with said seat and so that the pressure of the fluid on the valve member is toward its seat, and a differential screw means for adjusting and fixedly supporting said valve member from its seat.

4. In a structure of the class described, the combination of a casing provided with inlet and outlet connections, a valve seat, a valve member disposed to coact with said seat, means for fixedly supporting said valve member comprising a pair of adjusting members, the inner of which engages the valve member and is threaded into the outer and provided with laterally projecting lugs, and a bushing-like casing member into which the outer adjusting member is threaded provided with slots coacting with said lugs to support the inner adjusting member against rotation.

5. In a structure of the class described, the combination of a casing provided with inlet and outlet connections, a valve seat, a coacting valve member, means for fixedly supporting said valve member comprising a pair of adjusting members, the inner of which is threaded into the outer and engages the valve member, a bushing-like casing member into which the outer adjusting member is threaded, and means on said casing member and inner adjusting member coacting to support the inner member against rotation.

6. In a structure of the class described, the combination of a casing provided with inlet and outlet connections, a valve seat, a valve member disposed to coact with said seat, valve adjusting means comprising a pair of adjusting members, the inner of which engages the valve member and is threaded into the outer, the outer being threaded for adjustment, means for rotating the outer, and means for supporting the inner against rotation.

7. In a structure of the class described, the combination of a casing provided with inlet and outlet connections, a valve seat, a coacting valve member, and means for adjustably and fixedly supporting said valve member comprising a differential screw mechanism whereby very fine adjustment of the valve may be secured.

8. In a structure of the class described, the combination of a casing provided with inlet and outlet connections, a valve seat, a coacting valve member, and adjusting means for said valve member comprising a differential screw mechanism whereby very fine adjustment of the valve may be secured.

In witness whereof, I have hereunto set my hand and seal in the presence of two witnesses.

KARL D. SMITH. [L. S.]

Witnesses:
 DORIS WILLIAMS,
 LOUIS E. STEWART.